US009726755B2

(12) United States Patent
Kitchens, II et al.

(10) Patent No.: US 9,726,755 B2
(45) Date of Patent: Aug. 8, 2017

(54) SPOOF DETECTION BY ULTRASONIC SUBDERMAL PROBE

(71) Applicant: QUALCOMM Incorporated, San Diego, CA (US)

(72) Inventors: Jack Conway Kitchens, II, Tonawanda, NY (US); John Keith Schneider, Williamsville, NY (US); Stephen Michael Gojevic, Lockport, NY (US); Timothy Alan Dickinson, Carlsbad, CA (US); Philip John Schneider, Williamsville, NY (US); Evan Breloff, Lockport, NY (US); Evan Robert Hildreth, Thornhill, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/863,114

(22) Filed: Sep. 23, 2015

(65) Prior Publication Data

US 2017/0082740 A1   Mar. 23, 2017

(51) Int. Cl.
*G01S 7/539* (2006.01)
*G06K 9/00* (2006.01)

(52) U.S. Cl.
CPC ............ *G01S 7/539* (2013.01); *G06K 9/0012* (2013.01); *G06K 9/00107* (2013.01); *G06K 9/00899* (2013.01)

(58) Field of Classification Search
CPC .. G01S 7/539; G06K 9/00107; G06K 9/0002; G06K 9/00067; G06K 9/00087; G06K 9/0012

See application file for complete search history.

(56) References Cited

U.S. PATENT DOCUMENTS

| 5,801,681 A | * | 9/1998 | Sayag | G06F 3/021 345/157 |
| 6,166,370 A | * | 12/2000 | Sayag | G06F 3/021 250/221 |

(Continued)

FOREIGN PATENT DOCUMENTS

| JP | 2006212269 | 8/2006 |
| WO | WO 2017053472 | * 3/2017 |

OTHER PUBLICATIONS

Google translation of JP2006212269A.*
International Search Report and Written Opinion—PCT/US2016/052945—ISA/EPO—Dec. 12, 2016.

*Primary Examiner* — Daniel Pihulic
(74) *Attorney, Agent, or Firm* — Weaver Austin Villeneuve & Sampson LLP (57) ABSTRACT

Methods and systems of determining whether an object is alive, and therefore part of a live individual, are described. An object having an outer surface (e.g. a friction-ridge surface of a finger) and internal parts (e.g. tissue layer, papillae, blood vessels, fat, muscle, nail and bone) is scanned by a system having a transmitter, receiver and computer. One such system has a substantially planar piezoelectric transmit-layer, an ultrasonic receiver array having a plurality of receivers, and a platen. The transmit layer is caused to produce an ultrasound plane-wave traveling toward the object residing on the platen. Using the ultrasonic receiver, ultrasonic energy that has been reflected from the object is detected. The detected ultrasonic energy is analyzed to provide an analysis result, and the analysis result is compared to a template. A determination is made as to whether the analysis result and the template are similar, and the object is declared to be alive if the analysis result is determined to be similar to the template.

30 Claims, 3 Drawing Sheets

(56) References Cited

U.S. PATENT DOCUMENTS

| | | | |
|---|---|---|---|
| 6,255,643 B1* | 7/2001 | Sayag | G06F 3/021 |
| | | | 250/208.1 |
| 6,320,177 B1* | 11/2001 | Sayag | G06F 3/021 |
| | | | 250/208.1 |
| 7,349,556 B2 | 3/2008 | Brooks | |
| 7,804,984 B2* | 9/2010 | Sidlauskas | G06K 9/0004 |
| | | | 340/5.53 |
| 9,424,456 B1* | 8/2016 | Kamath Koteshwara | G06K 9/0002 |
| 9,639,765 B2* | 5/2017 | Du | G06K 9/00906 |
| 2010/0113952 A1* | 5/2010 | Raguin | G06K 9/0012 |
| | | | 600/509 |
| 2012/0177257 A1 | 7/2012 | Maev et al. | |
| 2012/0237091 A1* | 9/2012 | Nakamura | G06K 9/00 |
| | | | 382/124 |
| 2013/0136321 A1 | 5/2013 | Lee et al. | |
| 2014/0219521 A1* | 8/2014 | Schmitt | G06K 9/0002 |
| | | | 382/124 |
| 2014/0241596 A1* | 8/2014 | Chen | G06K 9/00885 |
| | | | 382/124 |
| 2016/0070967 A1* | 3/2016 | Du | G06K 9/00093 |
| | | | 382/124 |
| 2016/0070968 A1* | 3/2016 | Gu | G06K 9/00093 |
| | | | 382/125 |
| 2016/0246396 A1* | 8/2016 | Dickinson | G06F 3/03545 |
| 2016/0350573 A1* | 12/2016 | Kitchens, II | G06K 9/0002 |
| 2017/0090024 A1* | 3/2017 | Kitchens, II | G01S 7/539 |

* cited by examiner

SPOOF DETECTION BY ULTRASONIC SUBDERMAL PROBE

FIELD OF THE DISCLOSURE

This document relates to systems and methods of determining whether an object is alive.

BACKGROUND OF THE DISCLOSURE

Biometric sensors are widely used to distinguish between (a) individuals that are authorized to engage in an activity, and (b) individuals that are not authorized to engage in that activity. For example, fingerprint sensors are commonly used to determine whether a fingerprint provided by an individual matches information in a database, and if a match is determined, then the individual may be allowed to engage in an activity. For example, the individual may be allowed to enter a building or room, or allowed to use an electronic device (such as a cell phone).

Biometric sensors can be deceived (a.k.a. "spoofed"), and thereby permit an unauthorized individual to engage in an activity that is reserved for authorized individuals. Spoofing a fingerprint sensor may be accomplished in many different ways. These include: using a fake fingerprint, and using a dead finger from a person. One method of guarding against spoofing involves determining whether the biometric exhibits characteristics associated with liveness.

As more and more biometrics are used for user identification and/or verification, liveness detection becomes increasingly important in order to ensure security and accuracy. Liveness detection is important because many methods of deceiving an identification system and/or verification system use spoofs that are not alive. For example, latex may be made to have ridges and valleys resembling a fingerprint of an authorized user. When such a latex spoof is presented to a fingerprint scanner, the scanning system may falsely conclude that the latex spoof is the finger of an authorized user, even though the latex spoof is not part of a living being. Therefore, a system which is able to detect whether a biometric is alive would be useful in detecting the presence of a spoof. In such a system, if a determination is made that a biometric was not alive, then the individual presenting the biometric would be denied the requested activity even if the biometric matches information in the identification/verification database.

SUMMARY OF THE DISCLOSURE

Described herein are methods of determining whether an object is alive, and therefore part of a live individual. Such a method may include providing an object having an outer surface (e.g. a friction-ridge surface of a finger) and internal parts (e.g. tissue layer, papillae, blood vessels, fat, muscle, nail and bone), and providing a system having a transmitter, receiver and computer. One such system has an ultrasonic sensor having a substantially planar piezoelectric transmit-layer, an ultrasonic receiver array having a plurality of receivers, and a platen. The transmit layer is caused to produce an ultrasound plane-wave traveling toward the object residing on the platen. Using the ultrasonic receiver, ultrasonic energy that has been reflected from the object is detected. The detected ultrasonic energy is analyzed to provide an analysis result, and the analysis result is compared to a template. A determination is made as to whether the analysis result and the template are similar, and the object is declared to be alive if the analysis result is determined to be similar to the template.

Analyzing detected ultrasonic energy may include determining a distance from the outer surface of the object to at least one of the internal parts of the object. The template may provide an acceptable range, and if the determined distance is in the acceptable range, then the object may be declared to be alive. The distance may be expressed in terms of the time need for ultrasonic energy to travel from the outer surface of the object to the particular internal parts of the object.

The analysis result may include a plurality of times. For example, each time may be an amount of time between producing the plane-wave and detecting energy reflected from one of the internal parts. Or, each time may be the amount of time needed for an energy wave to travel from one part of the object (or sensor) to another part of the object (or sensor). Similarly, the template may be a plurality of acceptable ranges, and a determination may be made as to whether the analysis result and the template are similar. For example, the analysis result and the template may be declared to be similar if each (or a predetermined number) of the plurality of times is determined to be within one of the acceptable ranges of the template.

The analysis result may be a reflected-energy-signal-ratio ("RESR") determined by (a) determining an amount of energy reflected by a surface ("ERS") of one of the internal parts (b) determining a total amount of energy reflected by the object ("ERO"), and (c) dividing the ERS by the ERO. The ERO may be determined by summing energy received by, for example, the ultrasonic receiver array. In such a method, the template may have a ratio-value that is compared to the RESR in order to determine whether to declare the object to be alive. The ratio value of the template may be a range of acceptable values.

Alternatively, in lieu of the ERO, the RESR may be determined by determining a total amount of energy reflected by the internal parts of the object ("ERI") and dividing the ERS by the ERI. The ERI may be determined by summing energy that has been (a) reflected by internal structures of the object and (b) received by the ultrasonic receiver array.

Also described herein are systems for determining whether an object is alive, and therefore part of a live individual. For example, such a system may include a transmitter, a receiver, and a computer. One such system has an ultrasonic sensor having a substantially planar piezoelectric transmit-layer, an ultrasonic receiver array having a plurality of receivers, a platen, and a computer. The computer may be in communication with the ultrasonic sensor and programmed to:
  (a) cause the transmit layer to produce a plane-wave traveling toward an object residing on the platen;
  (b) analyze reflected ultrasonic energy that has been detected by the ultrasonic receiver to provide an analysis result;
  (c) compare the analysis result to a template;
  (d) determine whether the analysis result and the template are similar; and
  (e) declare that the object is alive if the analysis result is determined to be similar to the template.

Generally speaking, the computer may be programmed via a non-transitory, computer-readable storage medium to carry out the steps of methods, including those outlined herein.

More generally, a system for determining whether an object is alive may comprise:

(a) a means for producing an ultrasound plane-wave traveling toward an object residing on a platen, the object having an outer surface and internal parts;
(b) a means for detecting ultrasonic energy that has been reflected from the object;
(c) a means for analyzing the detected ultrasonic energy to provide an analysis result;
(d) a means for comparing the analysis result to a template;
(e) a means for determining whether the analysis result and the template are similar; and
(f) a means for declaring that the object is alive if the analysis result is determined to be similar to the template.

In one embodiment of such a system, the means for analyzing detected ultrasonic energy may include a means for determining a distance from the outer surface to at least one of the internal parts, the template is an acceptable range, and the means for declaring that the object is alive does so if the determined distance is in the acceptable range. In another embodiment of such a system, the means for analyzing detected ultrasonic energy may include a means for determining a lapsed-time between reflection of the plane-wave from the outer surface and reflection of the at least one of the internal parts, the template is an acceptable range, and the means for declaring that the object is alive does so if the lapsed-time is in the acceptable range. The internal parts may be selected from the group consisting of papillae, one or more blood vessels, fat, muscle, and bone.

Also described herein is a non-transitory, computer-readable storage medium comprising one or more computer programs of computer readable instructions for execution by one or more processors that are in communication with an ultrasonic sensor. The ultrasonic sensor may have a substantially planar piezoelectric transmit-layer, an ultrasonic receiver array having a plurality of receivers, and a platen. The instructions of the one or more computer programs may include instructions for:
(a) causing the transmit layer to produce an ultrasound plane-wave traveling toward an object residing on the platen, the object having an outer surface and internal parts;
(b) using the ultrasonic receiver, detecting ultrasonic energy that has been reflected from the object;
(c) analyzing the detected ultrasonic energy to provide an analysis result; comparing the analysis result to a template;
(d) determining whether the analysis result and the template are similar; and
(e) declaring that the object is alive if the analysis result is determined to be similar to the template.

For example, in one embodiment of the non-transitory, computer-readable storage medium the instructions for analyzing detected ultrasonic energy may include instructions for determining a distance from the outer surface to at least one of the internal parts, the template is an acceptable range of distances, and the instructions for declaring that the object is alive cause a declaration to be made that the object is alive if the determined distance is in the acceptable range. In another embodiment of the non-transitory, computer-readable storage medium the instructions for analyzing detected ultrasonic energy may include instructions for determining a lapsed-time between reflection of the plane-wave from the outer surface and reflection of the at least one of the internal parts, the template is an acceptable range of times, and the instructions for declaring that the object is alive cause a declaration to be made that the object is alive if the lapsed-time is in the acceptable range. The internal parts may be selected from the group consisting of papillae, a blood vessel, fat, muscle, and bone.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1A:
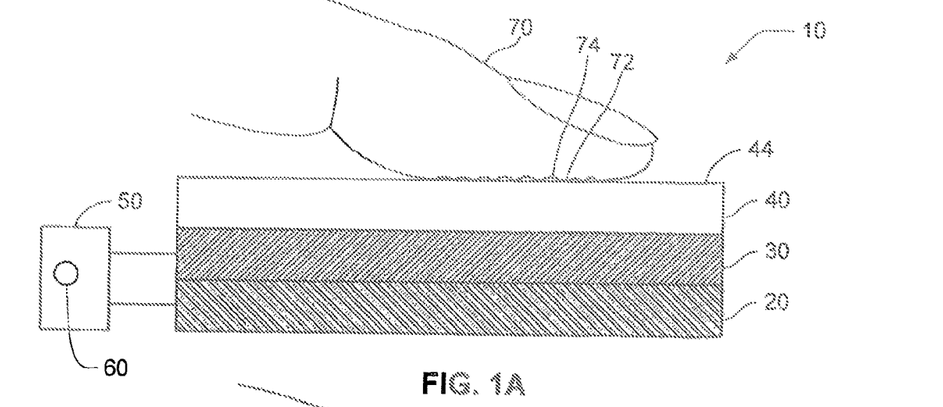
FIG. 1A depicts a system for determining whether an object is alive.

FIG. 1A depicts a system 10 that is in keeping with the invention. Such a system 10 may be used to determine whether an object 70, which has an outer surface (e.g. the friction ridge surface of a finger) and internal parts (e.g. tissue layer, papillae, a blood vessel, fat, muscle, nail and bone), has characteristics associated with a live biometric object (i.e. is part of a live individual) or does not have such characteristics (e.g. a spoof). In FIG. 1A there is shown an energy transmitter 20, an energy receiver 30, a platen 40, and a computer 50. The energy transmitter 20 may be an ultrasonic sensor having a substantially planar piezoelectric transmit-layer. The energy receiver 30 may be an ultrasonic receiver array having a plurality of receivers. An example of a system 10 having such a transmitter and receiver is model Ultratouch 203, which as designed and manufactured by Ultra-Scan Corporation and released for sale in 2002, or model Series 500 Fingerprint Scanner designed and manufactured by Ultra-Scan Corporation and released for sale at least as early as 2000.

Figure 1B:
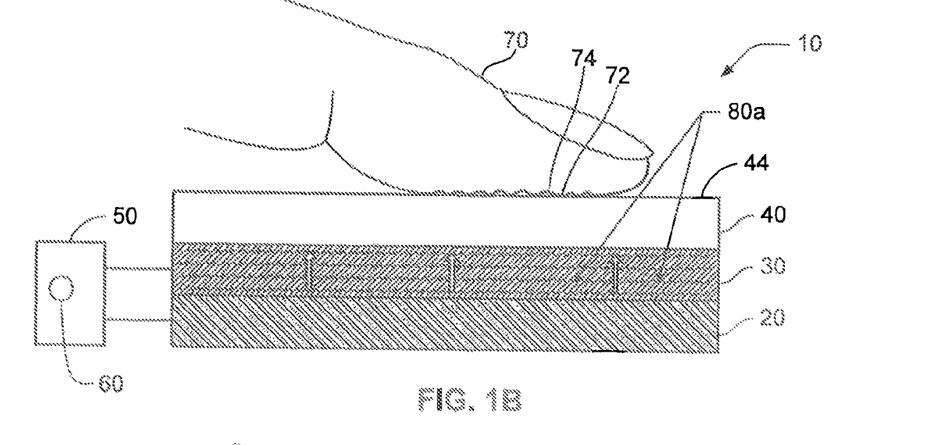
FIG. 1B depicts the system of FIG. 1A and shows an energy wave emanating from the transmitter and traveling toward an object being scanned.
Figure 1C:
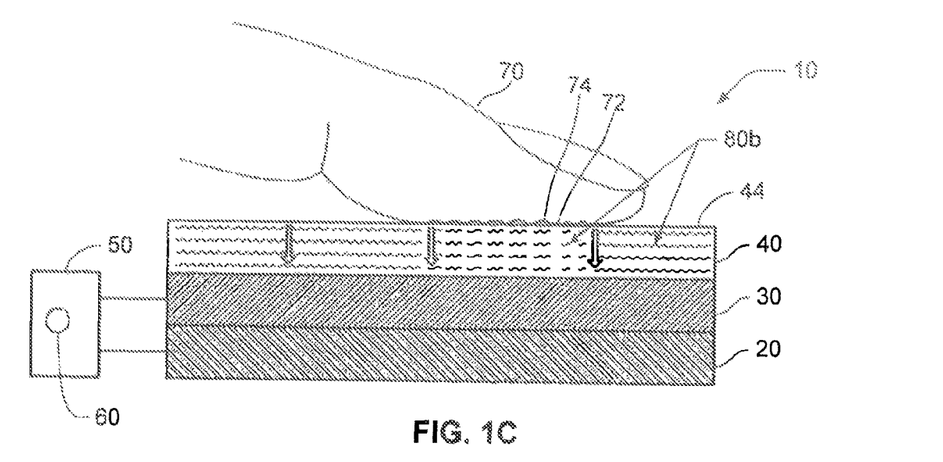
FIG. 1C depicts the system of FIG. 1A and shows reflected energy traveling toward the receiver.

FIG. 1B shows the system of FIG. 1A along with energy waves 80A traveling from the transmitter 20 toward the object 70. FIG. 1C shows the system of FIG. 1A along with reflected energy 80b traveling from the object 70 to the receiver 30.

FIGS. 1A-1C illustrate an example of an ultrasonic sensor system 10 according to aspects of the present disclosure. As shown in FIG. 1A, the ultrasonic sensor system 10 may include an ultrasonic transmitter 20 and an ultrasonic receiver 30 under a platen 40. The ultrasonic transmitter 20 may be a piezoelectric transmitter that can generate ultrasonic waves 80a (see FIG. 1B). The ultrasonic receiver 30 may include a layer of a piezoelectric material and an array of pixel circuits disposed on a substrate. In operation, the ultrasonic transmitter 20 may generate one or more ultrasonic waves 80a that travel through the ultrasonic receiver 30 to an exposed surface 44 of the platen 40. At the exposed surface 44 of the platen 40, the ultrasonic energy may either be transmitted, absorbed or scattered by a target object 70 that is in contact with the platen 40 such as the skin of a fingerprint ridge region 72, or reflected back toward the ultrasonic receiver 30. In locations where air contacts the exposed surface 44 of the platen 40, e.g., valley regions 74 between fingerprint ridge regions 72, most of the ultrasonic energy will be reflected back toward the ultrasonic receiver 30 for detection (see FIG. 1C). Control electronics of a computer 50 may be coupled to the ultrasonic transmitter 20 and the ultrasonic receiver 30 and may supply timing signals that cause the ultrasonic transmitter 20 to generate and launch one or more ultrasonic waves 80a. The control electronics of the computer 50 may then receive signals from the ultrasonic receiver 30 that are indicative of reflected ultrasonic energy, such as one or more reflected ultrasonic waves 80b that may be reflected from the exposed surface 44 of the platen 40. The control electronics of the computer 50 may use output signals received from the ultrasonic receiver 30 to construct a digital image of the target object 70. In some implementations, the control electronics of the computer 50 may also, over time, successively sample the output signals to detect the presence and/or movement of the target object 70. In addition to being able to analyze the outer surface of the object 70, energy is able to travel into the object, where it may be reflected by internal parts of the object. This reflected energy is also detectable by the receiver 30, but will arrive at a later time and may be substantially less than that reflected at the interface between the platen surface 44 and object 70.

According to aspects of the present disclosure, the ultrasonic transmitter 20 may be a plane wave generator including a substantially planar piezoelectric transmitter layer 24. See FIG. 2. Ultrasonic waves may be generated by applying a voltage to the piezoelectric layer 24 to expand or contract the layer 24, depending upon the signal applied, thereby generating a plane wave. The voltage may be applied across the piezoelectric transmitter layer 24 via a first transmitter electrode 22 and a second transmitter electrode 26. The first and second transmitter electrodes 22 and 26 may be metallized electrodes, for example, metal layers that coat opposing sides of the piezoelectric transmitter layer 24. In this fashion, an ultrasonic wave 80a may be made by changing the thickness of the layer via a piezoelectric effect. The ultrasonic wave 80a may travel toward a finger (or other object to be detected), passing through the platen 40. A portion of the wave not absorbed or transmitted by the object 70 to be detected may be reflected so as to pass back through the platen 40 and be received by the ultrasonic receiver 30.

Figure 2:
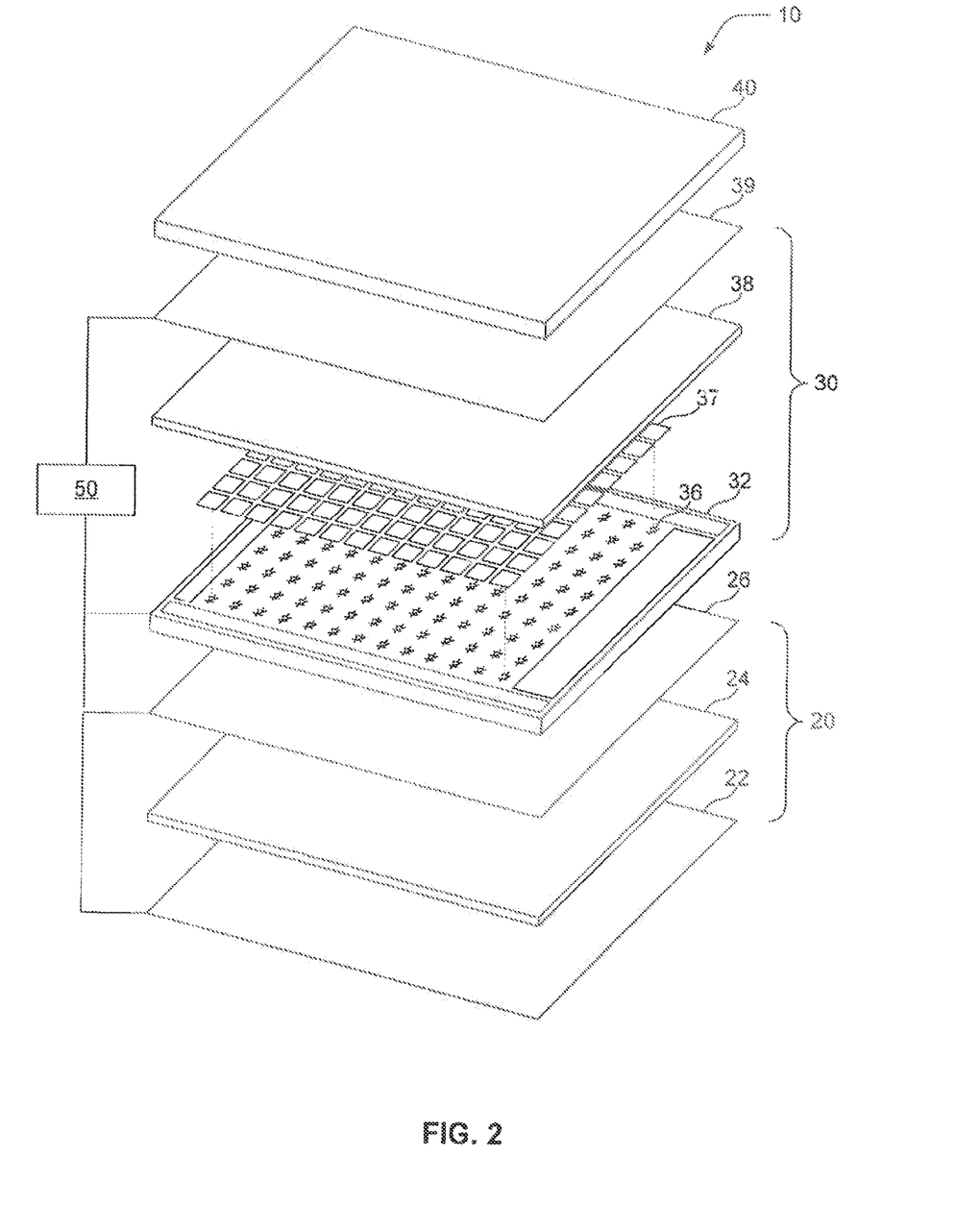
FIG. 2 is an exploded perspective view of the system depicted in FIG. 1A.

The ultrasonic receiver 30 may include an array of pixel circuits 36 disposed on a substrate 32 and a piezoelectric receiver layer 38. In some implementations, each pixel circuit 36 may include one or more TFT (Thin Film Transistor) elements, electrical interconnect traces and, in some implementations, one or more additional circuit elements such as diodes, capacitors, and the like. Each pixel circuit 36 may be configured to convert electric charge generated in the piezoelectric receiver layer 38 proximate the pixel circuit 36 into an electrical signal.

In the illustrated implementation depicted in FIG. 2, a receiver bias electrode 39 may be disposed on a side of the piezoelectric receiver layer 38 proximal to the platen 40. The receiver bias electrode 39 may be a metallized electrode and may be grounded or biased to control which signals are passed to the pixel circuit 36. Ultrasonic energy that is reflected from the exposed (top) surface 44 of the platen 40 may be converted into localized electrical charges by the piezoelectric receiver layer 38. These localized charges may be collected by the pixel input electrodes and passed on to the underlying pixel circuits. The charges may be amplified or buffered by the pixel circuits 36 and provided to the control electronics of the computer 50, which processes the output signals. One of ordinary skill in the art will appreciate that many variations of and modifications to the example shown in the simplified schematics may be utilized.

Control electronics of the computer 50 may be electrically connected to the first transmitter electrode 22 and the second transmitter electrode 26, as well as to the receiver bias electrode 39, the pixel circuits 36 on the substrate 32, and other control and data lines associated with the sensor system 10.

FIGS. 1A-1C and 2 show an example of an arrangement of an ultrasonic transmitter 20 and receiver 30 in an ultrasonic sensor system 10, other arrangements are possible. For example, in some implementations, the ultrasonic transmitter 20 may be above the ultrasonic receiver 30, i.e., closer to the object of detection 70. In some implementations, the ultrasonic sensor may include an acoustic delay layer. For example, an acoustic delay layer may be incorporated into the ultrasonic sensor between the ultrasonic transmitter 20 and the ultrasonic receiver 30. An acoustic delay layer may be employed to adjust the ultrasonic pulse timing, and at the same time electrically insulate the ultrasonic receiver 30 from the ultrasonic transmitter 20. The delay layer may have a substantially uniform thickness, with the material used for the delay layer and/or the thickness of the delay layer selected to provide a desired delay in the time for reflected ultrasonic energy to reach the ultrasonic receiver 30. In doing so, the range of time during which an energy pulse that carries information about the target object 70 (by virtue of having been reflected by the target object 70) may be made to arrive at the ultrasonic receiver 30 during a time range when it is unlikely that energy reflected from other parts of the ultrasonic sensor system 10 is arriving at the ultrasonic receiver 30. In some implementations, the TFT substrate and/or the platen 40 may serve as an acoustic delay layer.

The ultrasonic receiver 30 may include an array of pixel circuits 36 disposed on a substrate 32, which also may be referred to herein as a TFT substrate, a backplane, a panel, a sub-panel or a semiconductor substrate depending on the implementation, and a piezoelectric receiver layer 38. Each pixel circuit 36 may include a pixel input electrode 37 that electrically couples the piezoelectric receiver layer 38 to the pixel circuit 36. The piezoelectric receiver layer 38 may be in direct contact with the pixel input electrodes 37 (as with a coated or deposited process) or capacitively coupled to the pixel input electrodes 37 (as with a bonded or laminated process where a piezoelectric layer is attached with a thin adhesive layer). In some implementations, the substrate 32 may be a thin substrate, of a glass or plastic substrate, on which the sensor pixel circuits 36 are fabricated. In some implementations, the substrate 32 may be silicon, single-crystal silicon or other semiconductor material, such as a silicon wafer or a silicon-on-insulator wafer. The pixel circuits 36 and other circuitry related to substrate 32 may be formed from transistors fabricated in the substrate, such as a conventional silicon device wafer. In addition to the pixel circuits 36, the substrate 32 may have additional components fabricated thereon, such as one or more conductive bond pads and connective traces.

In the illustrated implementation, a receiver bias electrode 39 may be disposed on a side of the piezoelectric receiver layer 38 proximal to the platen 40. Control electronics of the computer 50 may be electrically connected to the first transmitter electrode 22 and the second transmitter electrode 26, as well as with the receiver bias electrode 39, the pixel circuits 36 and other circuitry on the substrate 32.

The platen 40 may be any appropriate material that can be acoustically coupled to the receiver. Examples of materials that may be suitable for the platen may include plastic, ceramic, glass, sapphire, gorilla glass, aluminum, stainless steel, a metal alloy, polycarbonate, a polymeric material, or a metal-filled plastic. In some implementations, the platen 40 can be a cover plate, e.g., a cover glass or a lens glass for a display. Detection and imaging can be performed through relatively thick platens if desired, e.g., 1 mm and above.

Examples of piezoelectric materials that may be employed according to various implementations include piezoelectric polymers having appropriate acoustic properties, for example, an acoustic impedance between about 2.5 MRayls and 5 MRayls. Specific examples of piezoelectric materials that may be employed include ferroelectric polymers such as polyvinylidene fluoride (PVDF) and polyvinylidene fluoride-trifluoroethylene (PVDF-TrFE) copolymers. Examples of PVDF copolymers include 60:40 (molar percent) PVDF-TrFE, 70:30 PVDF-TrFE, 80:20 PVDF-TrFE, and 90:10 PVDR-TrFE. Other examples of piezoelectric materials that may be employed include polyvinylidene chloride (PVDC) homopolymers and copolymers, polytetrafluoroethylene (PTFE) homopolymers and copolymers, and diisopropylammonium bromide (DIPAB).

The thickness of each of the piezoelectric transmitter layer 24 and the piezoelectric receiver layer 38 may be selected so as to be suitable for generating and receiving ultrasonic waves. In one example, a PVDF piezoelectric transmitter layer 24 is approximately 28 µm thick and a PVDF-TrFE receiver layer 38 is approximately 12 µm thick. Example frequencies of the ultrasonic waves are in the range of 5 MHz to 30 MHz, with wavelengths on the order of a quarter of a millimeter or less.

The computer 50 may be in communication with the transmitter 20 and receiver 30. The computer 50 may be programmed to cause the system 10 to scan the object 70 residing on the platen 40, and to receive information from the receiver 30 about reflected energy detected by the receiver 30. Programming of the computer 50 may be via a non-transitory, computer-readable storage medium 60, such as a CD, USB-flash drive, or read-only-memory device. The storage medium 60 may have instructions for causing the computer 50 to carry out one or more of the methods described herein. A scan may include causing the transmitter 20 to produce a plane-wave traveling toward the object 70, such as a finger, that resides on an exposed surface 44 of the platen 40. The emitted plane-wave travels to the object 70, where some of the wave energy is reflected. The reflected energy then travels to the receiver 30 where the reflected energy is detected by the receiver 30. The computer 50 may be programmed to analyze reflected energy that has been detected by the receiver 30, and then provide an analysis result. The analysis result may be compared by the computer 50 to a template in order to determine whether the analysis result and the template are similar. If it is determined that the analysis result and the template are similar, then the computer 50 may send a message that declares the object 70 to be alive. Otherwise, the computer 50 may send a message that declares the object 70 to be a spoof.

Analysis of the detected reflected energy may include determining a distance from the outer surface (e.g. the ridges 72 and valleys 74 of the friction ridge) of the object 70 to at least one of the internal parts of the object 70. The template may dictate that the determined distance should be within a particular range, and if the determined distance is in that particular range, then the computer 50 may declare that the object is alive. One manner of determining the distance, is to determine the time that lapses between receipt of energy reflected as a result of the object's 70 outer surface and receipt of energy reflected from an internal part of the object 70. The computer 50 may be programmed to declare that the object 70 is alive if the lapsed-time is in the particular range called for by the template.

To determine the amount of time that lapses between receipt of energy reflected from various parts of the object 70, the computer 50 may be programmed to determine a plurality of travel times. To do so, computer 50 may start a clock when the transmit-layer sends an energy pulse toward the object 70. The clock continues to run as the energy pulse travels to the object 70, and continues to run as reflected energy from each of the object's 70 surfaces travels to the receiver 30. When reflected energy is detected by the receiver 30, the computer 50 records the time, and this is the travel time associated with a particular part of the object 70. For clarity, the reflected energy from the various surfaces of the object 70 will arrive at different times, depending on the distance that each surface is from the platen surface 44. For example, since the outer surface of a biometric object 70 resting on the platen 40 is closest to the platen surface 44, the travel time associated with the outer surface will be relatively small. Internal parts of the object 70 residing near the outer surface (e.g. papillae) will have slightly longer travel times. And, internal parts of the object 70 residing far from the platen surface 44 (e.g. the bone or nail of a finger) will have the longest travel times. Since reflected energy will arrive at the receiver 30 at different times, the received energy will arrive as a plurality of energy pulses. By recording a travel time for each reflected energy pulse, the computer 50 may in effect determine the distances between the various parts of the object 70. Whether the distance is expressed in a traditional distance-measurement or in travel time, the result is the same. So, for example, by comparing the travel times to a template, the computer 50 may determine whether the receiver 30 received reflected energy at times that were expected according to the template. If the template is created to correspond to the distances between parts of the expected object 70 (e.g. a finger), matching travel times obtained from a scanning operation to travel times of the template will provide an indication as to whether the expected object was presented. For example, since a spoof is likely to be different from a live finger with regard to distances between parts of the finger (and parts of the spoof, as the case may be), the criteria of the template may be selected so as to distinguish between a live finger and a spoof.

If each of the travel times can be matched with one of the expected travel times of the template, the object 70 may be declared to be "alive". Although it might be ideal if all live biometric objects produced travel times that are identical to a template, the reality may be quite different. To accommodate differences between live biometric objects, each expected travel time may be a range of times. In this way, if a travel time falls within the expected range, a match for that part of the template may be declared.

Some biometric objects may be different enough from the general populous such that they do not conform to a particular template. To accommodate such biometric objects, and thereby avoid declaring them to be a "spoof" when in fact they are not (herein referred to as an "erroneous spoof-determination"), more than one template may be provided. In this manner, if the travel times determined from a scanning operation directed at an object match one of a plurality of templates, then the object may be declared to be "alive".

Another manner of avoiding an erroneous spoof-determination would be to allow some number (e.g. 3) of the expected travel times to go unmatched and yet declare the object to be "alive". For example, if the template identifies eight expected travel times, and at least five of the travel times determined by the computer for a particular object match with expected travel times of the template, then the object may be declared to be "alive". In this manner, if more than three of the expected travel times of the template are not matched by travel times corresponding to the object, the object is declared to be a spoof.

It will now be clear that many travel times (i.e. distances) may be detected and compared to a template that itself has many expected travel times. In this manner, the relative distances (which may be expressed in travel time) between many parts of the object 70 may be determined and compared to a template. For example, a template for a finger may be comprised of a plurality of distances (which may be expressed as a plurality of travel times), such as (a) the distance between the friction ridge surface and the bone, (b) the distance between the friction ridge surface and a muscle layer, and (c) the distance between a gland layer and a fat layer, the distance between the papillae and the bone, and so on. These distances may be compared to distances determined for the object 70 resulting from a scan, and a determination may be made as to whether to declare the scanned object 70 to be "alive". If enough of the distances determined for the scanned object 70 are in keeping with the template, the scanned object may be declared to be "alive".

Other means of analyzing the detected reflected energy are possible. In addition to or in lieu of determining travel times and comparing them to a template of travel times, the analysis may be based on the amount of energy reflected by each part of the object 70. In such a methodology, the template may be determined based on predetermined analyses of biometric objects in which the amount of energy reflected and received by a receiver is determined for multiple surfaces of a biometric object. After creating the template, an object 70 is subsequently scanned, and the energy levels of each reflected energy pulse received at the receiver 30 are determined and compared to the template. If the reflected energy pulses received at the receiver 30 match the template, then the object may be declared to be "alive". For example, the template may have a plurality of energy ranges, and if the received energy pulses are within those ranges, the object may be declared to be "alive."

The reflected energy may be expressed as a ratio of energies. For example, the ratio may be the energy associated with a particular reflected energy pulse divided by the total amount of received energy reflected by the object 70. Those parts of an object 70 having surfaces that reflect well will have a higher ratio than those parts of the object 70 that have surfaces which do not reflect well. To determine the total amount of energy reflected, the computer 50 may be programmed to sum the energy received by the receiver 30.

Alternatively, the reflected energy may be expressed as a ratio of the received energy associated with a particular reflected energy pulse divided by the total amount of received energy reflected by internal structures of the object 70. In such a system, energy reflected as a result of an outer surface of the object residing on the platen 40 is ignored. By ignoring for calculation purposes the energy reflected as a result of an outer surface of the object 70, it may be possible to better differentiate between the ratios corresponding to structures internal to the object 70. Since the outer surface of the object 70 will reside on a platen 40 that is a fixed distance from the receiver, it is possible to know which of the reflected energy pulses corresponds to the outer surface because the travel time corresponding to the platen surface 44 will be known. So, it is easy to identify and exclude the energy pulse associated with the outer surface from detection, or identify and then exclude that energy pulse from the calculations performed by the computer 50.

The template may dictate that the determined energy-ratio should be within a particular range, and if the determined energy-ratio is in that particular range, then the computer 50 may declare that portion of the template to be matched. If enough matches are made for a particular scan, the computer 50 may declare the object 70 is alive.

If each energy-ratio matches one of the expected energy-ratios of the template, the object 70 may be declared to be "alive". For example, the template may dictate that in order to declare the scanned object to be "alive", five energy pulses must be received and that one of the energy pulses must have an energy-ratio of X1, another of the energy pulses must have an energy-ratio of X2, two of the energy pulses must have energy-ratios of X3, and that another of the energy pulses must have an energy-ratio of X4, where X1, X2, X3, and X4 are acceptable values for the energy-ratio. Further, the template may dictate that the energy pulses arrive in a particular order. For example, if the template requires an energy pulse having an energy-ratio of X3 to arrive before an energy pulse that has an energy-ratio of X2, then an object would be declared to be a "spoof" if an energy pulse of X3 did not arrive before an energy pulse X2.

Although it might be ideal if all live biometric objects produced energy-ratios that are identical to a template, the reality may be quite different. To accommodate differences between live biometric objects, each expected energy-ratio may be a range of values. In this way, if a particular energy-ratio falls within the expected range, a match for that part of the template may be declared. For clarity, the values X1, X2, X3, and X4 in the preceding paragraph may each be a range of values.

Some biometric objects may be different enough from the general populous such that they do not conform to a particular template. To accommodate such biometric objects, and thereby avoid an erroneous spoof-determination, more than one template may be provided. In this manner, if the energy-ratios determined from a scanning operation directed at the object 70 residing on the platen match one of a plurality of templates, then the object 70 may be declared to be "alive".

Another manner of avoiding an erroneous spoof-determination would be to allow some number (e.g. 2) of the expected energy-ratios to go unmatched and yet declare the object to be "alive". For example, if the template identifies ten expected energy-ratios, and at least eight of the energy-ratios determined by the computer 50 for a particular object match with expected energy-ratios of the template, then the object 70 may be declared to be "alive". In this manner, if more than two of the expected energy-ratios of the template are unmatched by an energy-ratio corresponding to a scan of the object 70, the object 70 would be declared to be a spoof.

It is also possible to combine the two types of analyses. For example, the template may require an energy pulse to both (a) arrive at a particular time (which may be a range of times) and (b) have an energy-ratio of a particular value (which may be a range of values) in order for that part of the template to be declared to be a match. In a manner similar to that previously described, in order for an object to be declared "alive", the system 10 may not require matches with regard to each of the received energy pulses. Instead, the computer 50 may be programmed to declare an object to be "alive" when some fraction of the template criteria (e.g. when 5 criteria out of 8, or 8 criteria out of 10) are satisfied.

Having provided a description of systems for determining whether an object is a live object, we now move to describe a method for determining whether an object is a live object. In describing the method, it should be noted that we are also providing additional detail about systems, some of which are described above. Further, the system descriptions provided above may be useful in and relevant to an understanding of the methods described below.

Figure 3:
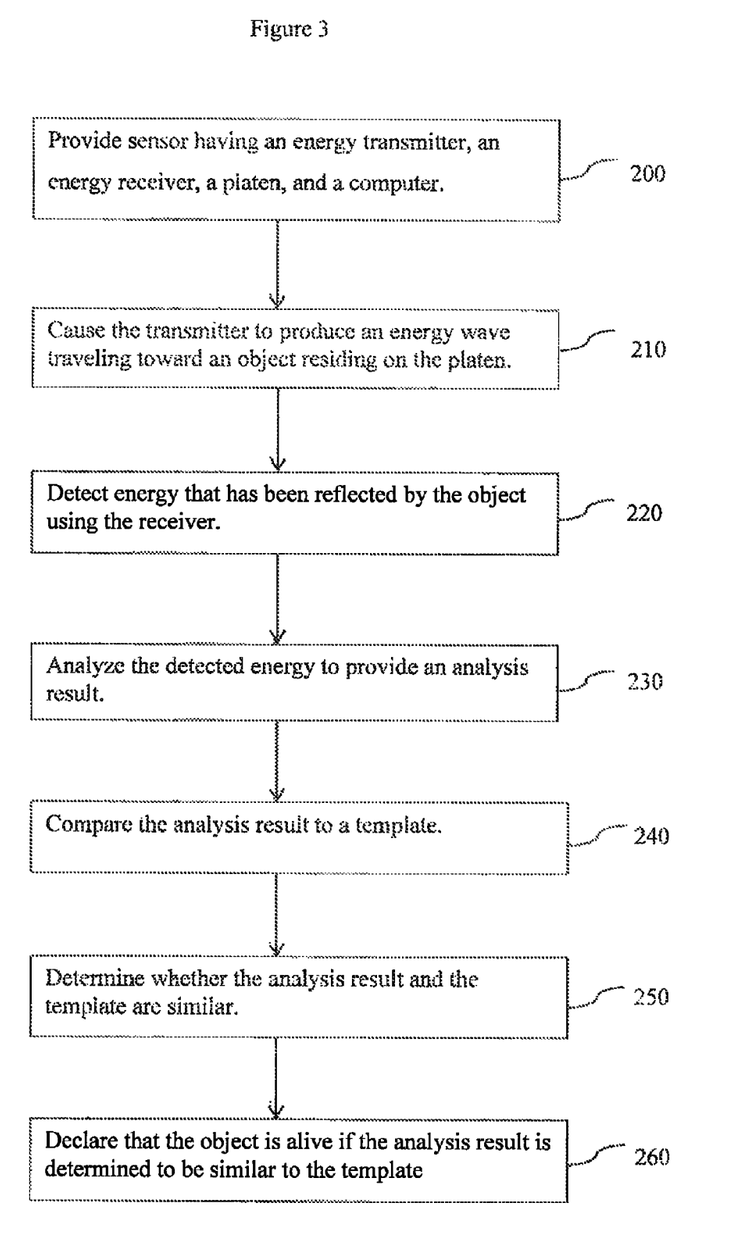
FIG. 3 is a flow diagram depicting steps of a method for determining whether an object is alive.

FIG. 3 is a flow diagram showing such a method. The method described in FIG. 3 provides 200 a sensor-system, which may be an ultrasonic sensor-system that is capable of emitting an ultrasound energy wave toward an object residing on a platen. The ultrasonic sensor may have (a) a platen on which an object may be placed for scanning, (b) an energy transmitter, which may include a substantially planar piezoelectric transmit-layer that is capable of emitting an ultrasound energy wave, and (c) an energy receiver, which may be an ultrasonic receiver array having a plurality of receivers that are capable of detecting reflected ultrasound energy.

The energy transmitter is caused 210 to produce a plane-wave traveling toward an object residing on the platen. The object has an outer surface (e.g. the friction ridge of a finger) in contact with the platen and also internal parts (e.g. tissue layer, papillae, a blood vessel, fat, muscle, nail and bone). Some of the energy embodied by the plane wave that was emitted by the transmitter reflects at an exposed surface 44 of the platen 40 where the outer surface of the object resides, and some of the energy reflects from internal parts of the object. Using the energy receiver, energy that has been reflected from the object is detected 220. The detected energy is analyzed 230 to provide an analysis result, and the analysis result is compared 240 to a template in order to determine 250 whether the analysis result and the template are similar. If the analysis result is determined 250 to be similar to the template, the object is declared 260 to be "alive", which may be interpreted to mean that the object is part of a live individual.

Analyzing 230 detected energy may include determining a distance from the outer surface to at least one of the internal parts. Or, analyzing 230 detected energy may include determining a distance between internal parts of the object. Such a distance may be expressed in terms of the amount of time it takes for an energy wave to travel that distance.

The template to which the analysis result is compared 240 may be in keeping with the templates described above. For the sake of brevity, the descriptions corresponding to templates will not be repeated here, but should be interpreted as being relevant to methods for determining whether an object is "alive". If the analysis result is determined 250 to match the template, for example a predetermined number of the determined distances (or times) are in the acceptable ranges specified by the template, then the object may be declared 260 to be "alive".

The analysis may analyze 230 the detected energy to determine a lapsed-time, for example, between (a) reflection of the plane-wave arising from the presence of the outer surface of the object and (b) reflection of one of the internal parts. If the determined lapsed time is within an acceptable range specified by the template, then that part of the template may be declared a match. And if enough matches are made between the analysis result and the template, then a declaration 260 may be made indicating that the object is alive. The analysis result may include a plurality of times, each time being an amount of time between producing the plane-wave and detecting energy reflected from one of the internal parts. Furthermore, the analysis result may be derived from such a plurality of times, for example, to produce a plurality of times corresponding to distances between the internal parts, or distances between the outer surface and one or more of the internal parts.

The analysis result may be a reflected-energy-signal-ratio ("RESR") that is determined by (a) determining an amount of energy reflected by a surface ("ERS") of one of the internal parts or as a result of the outer surface that is proximate to the platen, (b) determining a total amount of energy reflected by the object ("ERO"), and (c) dividing the ERS by the ERO. The ERO may be determined by summing the energy that is both reflected by the object and received by the receiver. Alternatively, the reflected-energy-signal-ratio ("RESR") may be determined by (a) determining an amount of energy reflected by a surface ("ERS") of one of the internal parts, (b) determining a total amount of energy reflected by the internal parts of the object ("ERI"), and dividing the ERS by the ERI. The ERI may be determined by summing energy that is both reflected by internal structures of the object and received by the receiver.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of determining whether an object is alive, comprising:
   providing an ultrasonic sensor having a substantially planar piezoelectric transmit-layer, an ultrasonic receiver array having a plurality of receivers, and a platen;
   causing the transmit layer to produce an ultrasound plane-wave traveling toward an object residing on the platen, the object having an outer surface and internal parts;
   using the ultrasonic receiver, detecting ultrasonic energy that has been reflected from the object;
   analyzing the detected ultrasonic energy to provide an analysis result;
   comparing the analysis result to a template;
   determining whether the analysis result and the template are similar; and
   declaring that the object is alive if the analysis result is determined to be similar to the template.

2. The method of claim 1, wherein:
   analyzing detected ultrasonic energy includes determining a distance from the outer surface to at least one of the internal parts;
   the template is an acceptable range; and
   declaring that the object is alive if the determined distance is in the acceptable range.

3. The method of claim 1, wherein:
   analyzing detected ultrasonic energy includes determining a lapsed-time between reflection of the plane-wave from the outer surface and reflection of the at least one of the internal parts;
   the template is an acceptable range; and
   declaring that the object is alive if the lapsed-time is in the acceptable range.

4. The method of claim 1, wherein the internal parts are selected from the group consisting of papillae, a blood vessel, fat, muscle, and bone.

5. The method of claim 1, wherein the internal part is a tissue layer.

6. The method of claim 1, wherein the analysis result includes a plurality of times, each time being an amount of time between producing the plane-wave and detecting energy reflected from one of the internal parts.

7. The method of claim 6, wherein:
the template is a plurality of acceptable ranges,
determining whether the analysis result and the template are similar includes determining, for each of the plurality of times, whether the time is within one of the acceptable ranges;
declaring that the object is alive if a predetermined number of the plurality of times is determined to be within one of the acceptable ranges.

8. The method of claim 1, wherein the analysis result is a reflected-energy-signal-ratio ("RESR") determined by:
determining an amount of energy reflected by a surface ("ERS") of one of the internal parts;
determining a total amount of energy reflected by the object ("ERO"); and
dividing the ERS by the ERO.

9. The method of claim 8, wherein the ERO is determined by summing energy received by the ultrasonic receiver array.

10. The method of claim 1, wherein the analysis result is a reflected-energy-signal-ratio ("RESR") determined by:
determining an amount of energy reflected by a surface ("ERS") of one of the internal parts;
determining a total amount of energy reflected by the internal parts of the object ("ERI"); and
dividing the ERS by the ERI.

11. The method of claim 10, wherein the ERI is determined by summing energy reflected by internal structures of the object and received by the ultrasonic receiver array.

12. The method of claim 10, wherein:
the template is an acceptable range, and
declaring that the object is alive if the RESR is in the acceptable range.

13. A system for determining whether an object is alive, comprising:
an ultrasonic sensor having a substantially planar piezoelectric transmit-layer, an ultrasonic receiver array having a plurality of receivers, and a platen; and
a computer in communication with the ultrasonic sensor and programmed to:
cause the transmit layer to produce a plane-wave traveling toward an object residing on the platen, the object having an outer surface and internal parts;
analyze reflected ultrasonic energy that has been detected by the ultrasonic receiver to provide an analysis result;
compare the analysis result to a template;
determine whether the analysis result and the template are similar; and
declare that the object is alive if the analysis result is determined to be similar to the template.

14. The system of claim 13, wherein the computer:
analyzes detected ultrasonic energy by determining a distance from the outer surface to at least one of the internal parts; and
declares that the object is alive if the determined distance is in an acceptable range of the template.

15. The system of claim 13, wherein the computer:
analyzes detected ultrasonic energy by determining a lapsed-time between receipt of a wave reflected from the outer surface and receipt of a wave reflected from the at least one of the internal parts; and
declares that the object is alive if the lapsed-time is in an acceptable range of the template.

16. The system of claim 13, wherein the analysis result is a plurality of times, each time being an amount of time between producing the plane-wave and detecting energy reflected from one of the internal parts.

17. The system of claim 16, wherein the computer:
determines whether the analysis result and the template are similar by determining, for each of the plurality of times, whether the time is within acceptable ranges specified by the template; and
declares that the object is alive if a predetermined number of the plurality of times is determined to be within the acceptable ranges.

18. The system of claim 13, wherein the analysis result is a reflected-energy-signal-ratio ("RESR") determined by:
determining an amount of energy reflected by a surface ("ERS") of one of the internal parts;
determining a total amount of energy reflected by the object ("ERO"); and
dividing the ERS by the ERO.

19. The system of claim 18, wherein the ERO is determined by the computer by summing energy received by the ultrasonic receiver array.

20. The system of claim 13, wherein the analysis result is a reflected-energy-signal-ratio ("RESR") determined by:
determining an amount of energy reflected by a surface ("ERS") of one of the internal parts;
determining a total amount of energy reflected by the internal parts of the object ("ERI"); and
dividing the ERS by the ERI.

21. The system of claim 20, wherein the ERI is determined by the computer by summing energy reflected by internal structures of the object and received by the ultrasonic receiver array.

22. The system of claim 20, wherein:
the template is an acceptable range, and
the computer declares that the object is alive if the RESR is in the acceptable range.

23. A system for determining whether an object is alive, comprising:
a means for producing an ultrasound plane-wave traveling toward an object residing on a platen, the object having an outer surface and internal parts;
a means for detecting ultrasonic energy that has been reflected from the object;
a means for analyzing the detected ultrasonic energy to provide an analysis result;
a means for comparing the analysis result to a template;
a means for determining whether the analysis result and the template are similar; and
a means for declaring that the object is alive if the analysis result is determined to be similar to the template.

24. The system of claim 23, wherein:
The means for analyzing detected ultrasonic energy includes a means for determining a distance from the outer surface to at least one of the internal parts;
the template is an acceptable range; and
the means for declaring that the object is alive does so if the determined distance is in the acceptable range.

25. The system of claim 23, wherein:
The means for analyzing detected ultrasonic energy includes a means for determining a lapsed-time between reflection of the plane-wave from the outer surface and reflection of the at least one of the internal parts;
the template is an acceptable range; and the means for declaring that the object is alive does so if the lapsed-time is in the acceptable range.

26. The system of claim 23, wherein the internal parts are selected from the group consisting of papillae, a blood vessel, fat, muscle, and bone.

27. A non-transitory, computer-readable storage medium comprising one or more computer programs of computer readable instructions for execution by one or more processors in communication with an ultrasonic sensor having a substantially planar piezoelectric transmit-layer, an ultrasonic receiver array having a plurality of receivers, and a platen, the computer program(s) comprising instructions for:
  causing the transmit layer to produce an ultrasound plane-wave traveling toward an object residing on the platen, the object having an outer surface and internal parts;
  using the ultrasonic receiver, detecting ultrasonic energy that has been reflected from the object;
  analyzing the detected ultrasonic energy to provide an analysis result;
  comparing the analysis result to a template;
  determining whether the analysis result and the template are similar; and
  declaring that the object is alive if the analysis result is determined to be similar to the template.

28. The storage medium of claim 27, wherein:
  the instructions for analyzing detected ultrasonic energy includes instructions for determining a distance from the outer surface to at least one of the internal parts;
  the template is an acceptable range; and
  the instructions for declaring that the object is alive cause a declaration to be made that the object is alive if the determined distance is in the acceptable range.

29. The storage medium of claim 27, wherein:
  the instructions for analyzing detected ultrasonic energy includes instructions for determining a lapsed-time between reflection of the plane-wave from the outer surface and reflection of the at least one of the internal parts;
  the template is an acceptable range; and
  the instructions for declaring that the object is alive cause a declaration to be made that the object is alive if the lapsed-time is in the acceptable range.

30. The storage medium of claim 27, wherein the internal parts are selected from the group consisting of papillae, a blood vessel, fat, muscle, and bone.

* * * * *